United States Patent [19]

Caldwell et al.

[11] Patent Number: 4,880,697

[45] Date of Patent: Nov. 14, 1989

[54] BARRIER FILM

[75] Inventors: Janice D. Caldwell, Henrico County; Walter H. Knox, III, Rockingham County, both of Va.

[73] Assignee: Reynolds Metals Company, Richmond, Va.

[21] Appl. No.: 209,435

[22] Filed: Jun. 21, 1988

[51] Int. Cl.$^4$ ............................................. B29D 22/00
[52] U.S. Cl. ................................. 428/35.4; 428/333; 428/516; 428/910
[58] Field of Search ...................... 428/910, 516, 35.4, 428/333

[56] References Cited

U.S. PATENT DOCUMENTS

| | | | |
|---|---|---|---|
| 4,284,674 | 8/1981 | Sheptak | 428/69 |
| 4,405,667 | 9/1983 | Christensen et al. | 428/35.4 |
| 4,421,823 | 12/1983 | Theisen et al. | 428/349 |
| 4,447,494 | 5/1984 | Wagner, Jr. et al. | 428/349 |
| 4,457,960 | 7/1984 | Newsome | 428/35 |
| 4,464,443 | 8/1984 | Farrell et al. | 428/688 |
| 4,561,920 | 12/1985 | Foster | 156/244.11 |
| 4,572,854 | 2/1986 | Dallmann et al. | 428/35 |
| 4,640,856 | 2/1987 | Ferguson et al. | 428/36 |
| 4,647,509 | 3/1987 | Wallace et al. | 428/474.9 |
| 4,681,797 | 7/1987 | Van Iseghem | 428/212 |
| 4,695,491 | 9/1987 | Kondo et al. | 428/35 |
| 4,713,296 | 12/1987 | Aoyama et al. | 428/412 |
| 4,746,562 | 5/1988 | Fant | 428/35.4 |
| 4,778,699 | 10/1988 | Knox, III et al. | 428/516 |
| 4,801,486 | 1/1989 | Quacquarella et al. | 428/35.4 |

*Primary Examiner*—Edith Buffalow
*Attorney, Agent, or Firm*—Alan T. McDonald

[57] ABSTRACT

A multi-layer barrier film having heat seal properties to permit both fin and lap sealing is disclosed. The film comprises a pair of coextrusions that are adhesively bonded to one another.

21 Claims, No Drawings

BARRIER FILM

BACKGROUND OF THE INVENTION

In packaging confectioneries, such as chocolates, a packaging film must provide several properties. These properties include aroma barrier, oxygen barrier, moisture barrier, machinability, stiffness, and heat sealability. At the same time, the film must be cost effective.

The known plastics resin film for packaging confectioneries, such as chocolate pieces, comprises polyvinylidene chloride-cellophane-polyvinylidene chloride-adhesive-polypropylene-polyvinylidene chloride-release coating. While this film has proven satisfactory for such purposes, there are problems when using this film. In producing a bag for containing the confectioneries, a structure using both a lap seal and a fin seal is desired. While the above film laminate is capable of satisfactory fin seals, it does not produce good lap seals, as the release layer acts as a contaminate when sealing the surface polyvinylidene chloride layers.

Further, this film structure is relatively expensive to produce, due to the cellophane layer and the polyvinylidene chloride coatings thereon.

There thus remains a need for a packaging film for confectioneries which retains the desired attributes of the known materials and which at the same time improves the sealability, and especially the lap sealability, of the structure, while reducing the cost of the structure.

THE PRESENT INVENTION

By means of the present invention, these desired goals have been obtained. The plastics resin film laminates of the present invention retain the aroma barrier, oxygen barrier, moisture barrier, machinability and stiffness properties of the known films. By eliminating the need for a release coating, the films of the present invention produce not only good fin seals, but also good lap seals. In addition, by eliminating the cellophane layer, the films of the present invention are less costly to produce than the known films.

The plastics resin films of the present invention comprise two multi-layer coextrusions of the form A—B or A—B—C and D—E—F—E—G which are bonded to one another between the B or C and D layers by a thermoset adhesive.

DETAILED DESCRIPTION OF THE PREFERRED EMBODIMENTS

The multi-layer film structure of the present invention is formed from two coextrusions which are bonded to one another.

The first coextrusion is of the form A—B or A—B—C. Layer A, which forms the outermost surface of the completed structure, is an ethylene-propylene copolymer. Layer A preferably includes a slip and/or anti-block additive. Layer B is a polypropylene homopolymer. Layer C is an ethylene-propylene copolymer. Layer A preferably has a somewhat wider heat seal temperature range than layer C by virtue of a higher ethylene content. Layer B or C may be treated, such as by corona treatment, to permit reverse printing thereon.

The overall gauge of the A—B or A'B—C coextrusion may be from about 0.5 mil to about 2.0 mil, with a preferred gauge of about 0.7 mil.

The complete A—B or A—B—C coextrusion may be biaxially oriented in an amount from about 2-7:1 and preferably about 4.3:1 in the machine direction and from about 5-10:1 and preferably about 8:1 in the cross direction. This provides stiffness, strength, machinability and moisture barrier properties to the composite structure.

The biaxially oriented A—B—C coextrusion is available commercially. It is sold by Mobil Chemical Company under its BICOR® BSR identification and by Hercules Incorporated as its HST522/2S identification.

The second coextrusion is of the form D—E—F—E—G.

Layer D is a propylene-ethylene random copolymer. This material is available from Exxon Chemical as its PD-9252 resin and from Quantum Chemical Corporation as its 3303SK resin. Layer D may have a gauge ranging from about 0.15 mil to about 0.75 mil, and is preferably about 0.225 mil.

Layer E is a polyolefin-polypropylene resin chemically modified to impart high levels of adhesion in coextrusion. This material is available from Quantum Chemical Corporation as its Plexar 420 resin and from Dupont as its Bynel CXA E304 resin. Layer E may have a gauge ranging from about 0.05 to about 0.2 mil and is preferably about 0.075 mil.

Layer F is an ethylene-vinyl alcohol copolymer which has a mole percent ethylene from about 27 to about 50 and preferably from about 28 to about 36. This material is available from Evalca as its Eval SC-F101 resin or as its Eval EP-F101 resin. Layer F may have a gauge ranging from about 0.05 mil to about 0.5 mil and is preferably about 0.1 mil.

Layer G is the same as layer D, but preferably includes a slip additive and/or an anti-block additive. Layer D may include these materials as well, thus making it identical to layer G, but this is not necessary or preferred for purposes of the present invention. Layer G may have a gauge ranging from about 0.15 mil to about 0.75 mil and is preferably about 0.325 mil.

Layer G provides the heat seal properties of the film structure. Layer G may heat seal to itself when forming a fin seal and also heat seals to layer A to permit formation of lap seals.

The two coextrusions are adhesively bonded to one another by means of a thermoset adhesive. Suitable thermoset adhesives include urethane adhesives, water based adhesives, and high solids adhesives. A particularly suitable adhesive is a urethane adhesive available from Morton Thiokol in a two component system comprising Lamal 408-40 and Lamal C crosslinker. The adhesive is applied in a range from about 1 to 4 pounds per 432,000 square inches and preferably about 2 pounds per 432,000 square inches.

EXAMPLE

A plastics resin film according to the present invention was produced. A biaxially oriented A—B—C coextrusion, in which layer A was an ethylene-propylene copolymer, layer B was a polypropylene homopolymer and layer C was a corona treated ethylene-propylene copolymer, was employed which was a 0.7 mil Bicor BSR film from Mobil Chemical.

A D—E—F—E—G coextrusion was formed in which layer D was Exxon PD 9142G propylene-ethylene random copolymer having a gauge of 0.225 mil, layer E was Plexar 3555 chemically modified polyolefin-polypropylene resin having a gauge of 0.075 mil, layer F was Eval EP-F101 ethylene-vinyl alcohol copolymer containing 32 mole percent ethylene and layer G was Exxon PD 9142G propylene-ethylene random copolymer with a slip additive and having a gauge of 0.325 mil.

Layer C was reverse printed prior to lamination to layer D. A two part urethane adhesive comprising Morton Thiokol Lamal 408-40 and Lamal C crosslinker was applied to layer C at a level of 2 pounds per 432,000 square inches.

The measured properties of the laminated structure were as follows:

| Property | Value |
| --- | --- |
| Overall Thickness | 1.7 mil |
| Tensile strength - machine direction | 18 pounds/inch |
| Tensile strength - cross direction | 30 pounds/inch |
| Elongation - machine direction | 189% |
| Elongation - cross direction | 61% |
| Impact resistance | 20.6 centimeters-kilograms |
| Peel strength at adhesive-machine direction | 435 grams/inch |
| Peel strength at adhesive-cross direction | 240 grams/inch |
| Tear strength - machine direction | 14 grams |
| Tear strength - cross direction | 20 grams |
| Heat seal strength at 320° F. for 1 second 40 pounds per square inch pressure | |
| Lap seal - machine direction | 2.0 pounds |
| Lap seal - cross direction | 2.3 pounds |
| Fin seal - machine direction | 3.6 pounds |
| Fin seal - cross direction | 4.2 pounds |
| Moisture vapor transmission rate - grams per 100 square inches in 24 hours | 0.25 |
| Oxygen transmission rate - cubic centimeters per 100 square inches in 24 hours at 1 atmosphere | 0.07 |

These figures illustrate that the films of the present invention provide sufficient strength both for lap seals and fin seals, while providing excellent moisture and vapor barrier properties.

While the present invention has been described with reference to certain specific embodiments thereof, it is not intended to be so limited thereby, except as set forth in the accompanying claims.

We claim:

1. A laminated plastics resin film comprising a pair of adhesively bonded coextrusions, the first of said coextrusions being biaxially oriented and having the form A—B or A—B—C and the second of said coextrusions having the form D—E—F—E—G, wherein:

Layer A is an ethylene-propylene copolymer;
Layer B is a polypropylene homopolymer;
Layer C is an ethylene-propylene copolymer;
Layer D is an propylene-ethylene random copolymer;
Layer E is a chemically modified polyolefin-polypropylene resin;
Layer F is an ethylene-vinyl alcohol copolymer; and
Layer G is a propylene-ethylene random copolymer;
and wherein said coextrusions are bonded to one another at their B or C and D layers with a thermoset adhesive.

2. The film of claim 1 wherein said first coextrusion is biaxially oriented in an amount from about 2-7:1 in the machine direction and from about 5-10:1 in the cross direction.

3. The film of claim 2 wherein said first coextrusion is biaxially oriented in an amount of about 4.3:1 in the machine direction and 8:1 in the cross direction.

4. The film of claim 1 wherein said first coextrusion has an overall gauge of from about 0.5 to about 2.0 mil.

5. The film of claim 4 wherein said first coextrusion has an overall gauge of about 0.7 mil.

6. The film of claim 1 wherein layer D has a gauge of from about 0.15 to about 0.75 mil.

7. The film of claim 6 wherein layer D has a gauge of about 0.225 mil.

8. The film of claim 1 wherein layer E has a gauge of from about 0.05 to about 0.2 mil.

9. The film of claim 8 wherein layer E has a gauge of about 0.075 mil.

10. The film of claim 1 wherein layer F has a gauge of from about 0.05 to about 0.5 mil.

11. The film of claim 10 wherein layer F has a gauge of about 0.1 mil.

12. The film of claim 1 wherein layer G has a gauge of from about 0.15 to about 0.75 mil.

13. The film of claim 12 wherein layer G has a gauge of about 0.325 mil.

14. The film of claim 1 wherein layer B or C is corona treated.

15. The film of claim 14 wherein layer B or C is reverse printed.

16. The film of claim 1 wherein layer A includes at least one of a slip or an anti-block additive.

17. The film of claim 1 wherein layer G includes at least one of a slip or an anti-block additive.

18. The film of claim 17 wherein layer D includes at least one of a slip or an anti-block additive.

19. The film of claim 1 wherein said adhesive is a member selected from the group consisting of urethane, high solids and water-based thermoset adhesives.

20. The film of claim 1 wherein said adhesive is present in an amount of from about 1 to 4 pounds per 432,000 square inches.

21. The film of claim 20 wherein said adhesive is present in an amount of about 2 pounds per 432,000 square inches.

* * * * *